Inventor:
William E. Wine,
by Parker Cook.
Atty.

June 24, 1930.  W. E. WINE  1,766,273
GEARED HAND BRAKE FOR FREIGHT CARS
Filed Sept. 21, 1926   3 Sheets-Sheet 2

Inventor:
William E. Wine,
by Parker Cook.
Atty.

June 24, 1930.  W. E. WINE  1,766,273
GEARED HAND BRAKE FOR FREIGHT CARS
Filed Sept. 21, 1926  3 Sheets-Sheet 3
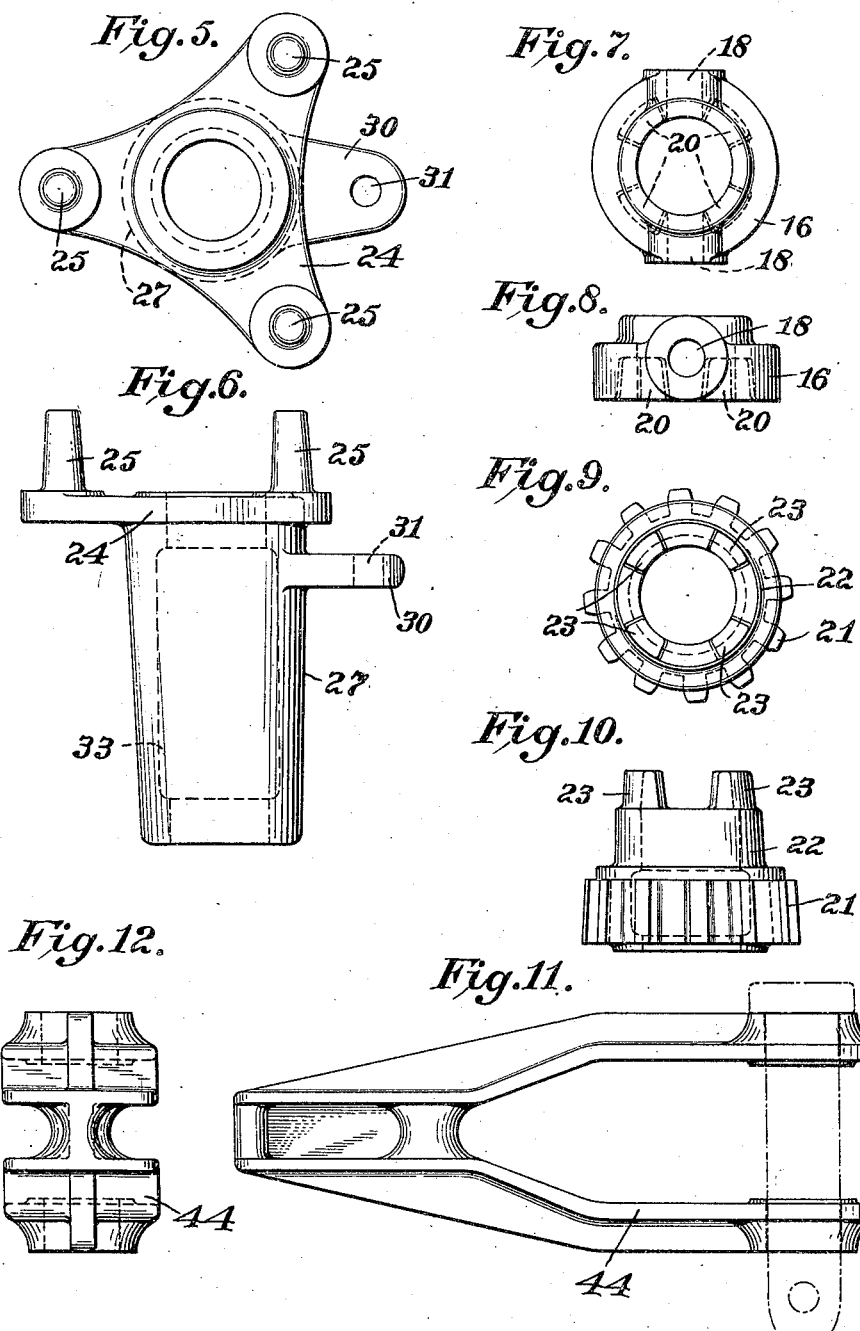
Inventor:
William E. Wine,
by Parker Cook.
Atty.

Patented June 24, 1930

1,766,273

UNITED STATES PATENT OFFICE

WILLIAM E. WINE, OF TOLEDO, OHIO

GEARED HAND BRAKE FOR FREIGHT CARS

Application filed September 21, 1926. Serial No. 136,792.

My invention relates to geared hand brakes for freight cars and has for an object to provide a hand brake mechanism that will be powerful in action, to thereby apply the brakes when the hand wheel is operated.

As is well known to those skilled in the art, it is necessary to apply a relatively large force to the small hand wheel to pull the brake shoes against the wheels, in fact, a pressure of about 125 pounds must be exerted on the rim of the hand wheel to provide the necessary braking power to the brake shoes.

In a number of instances gears and pinions are located at the lower end of the brake mast and in designing the hand brakes the radius of the hand wheel, the number of teeth in the gears and pinions and the radius of the winding drum on the mast, must all be considered to determine the amount of power necessary and within the capacity of the brakeman to apply to the hand wheel to operate the brakes.

Due to the large amount of power necessary to be exerted, the gears and pinions have to be relatively large and, therefore, take up considerable space, or the gear ratio is such that it is sometimes necessary for the brakeman to place a stick or lever in the wheel to thereby provide a greater leverage to apply the brakes.

One of the objects of the present invention is to provide a better and stronger and easily operated geared brake mechanism that may be applied to the present brake mast without any change to same, provided the hole for the ½ bolt is located in the proper position. If this hole is not located properly in the brake mast, it is simply necessary to drill a new hole in the correct position and apply the gear mechanism to the lower end of the brake mast.

Still another object of the invention is to provide a gear mechanism that will occupy but little space at the lower end of the brake mast and fit within the limits established for the form of brake mechanism now in use.

Still another object of the invention is to provide a geared mechanism for power hand brakes in the form of a planetary system that will be powerful in operation, may be readily operated, will be so geared as to transmit the requisite amount of power to the brakes and may be applied to the brake masts now in general use.

With these and other objects in view the invention consists in certain new and novel arrangements and combination of parts as will be hereinafter more fully described and pointed out in the claims.

Referring now to the drawings showing a preferred embodiment of my invention,

Fig. 5 is a top plan view of the spider drum for supporting the idler pinions.

Fig. 6 is a side elevation of the same.

Fig. 7 is a top plan view of the fastening cap.

Fig. 8 is a side elevation of the same.

Fig. 9 is a top plan view of the sun gear and its hub.

Fig. 10 is a side elevation of the same.

Fig. 11 is a plan view of the sheave and yoke, and

Fig. 12 is an end view of the same.

Figure 3:
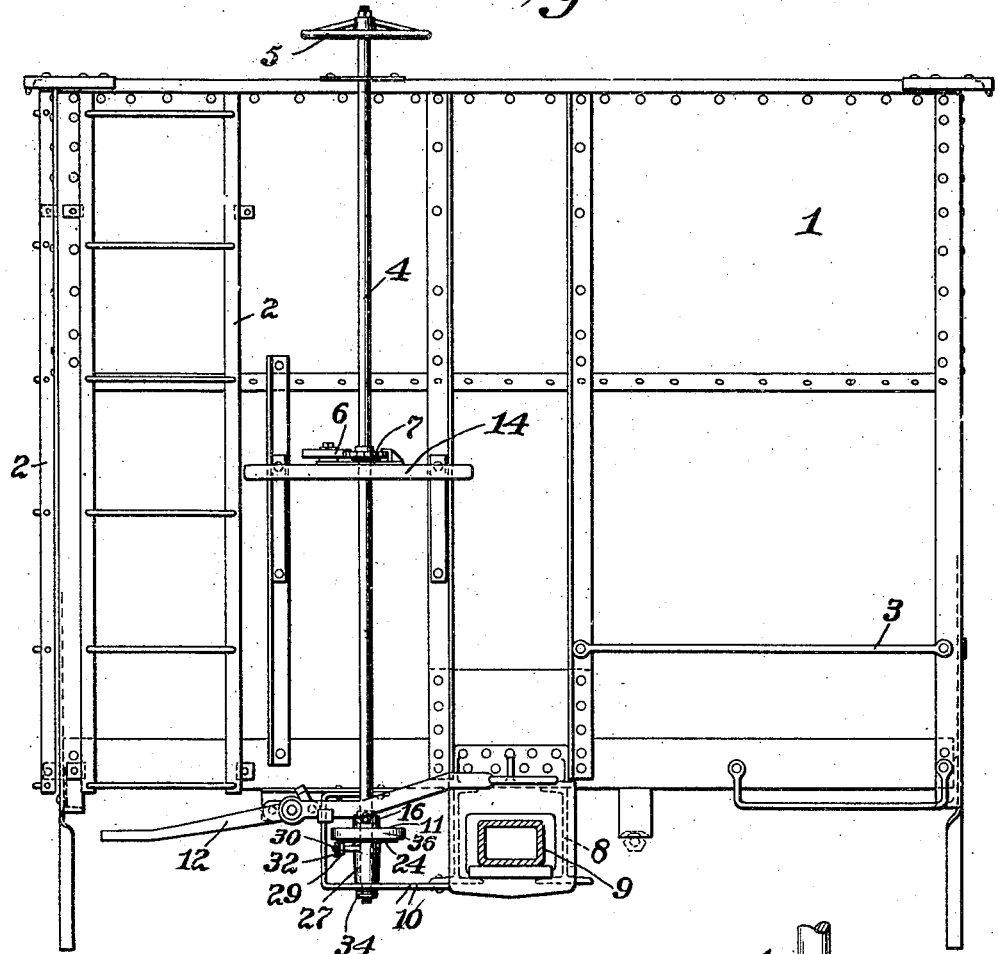
Fig. 3 is an end view of a freight car showing the application of this mechanism to the brake mast.

Referring now more specifically to the several views and Fig. 3 in particular, there is shown an end 1 of a steel car provided with the ladders 2, grab iron 3, the brake mast 4, hand wheel 5, pawl 6 and ratchet 7, also at the lower end of the car may be seen the center sill 8, striking plate 9 and the bracket or stirrup 10 for supporting the usual mast and hand brake mechanism. This stirrup also forms the limits of the gearing for the hand brake and whatever form used must fit within these limits. In the present instance my improved gearing 11 is shown attached to the brake mast 4 which will be shortly described in detail. There is also shown the usual uncoupling lever 12.

The usual pawl 6 and ratchet 7 are shown as supported on a small platform 14 and these or their location need not be changed in any way. The construction so far set out is standard, with the exception of the brake gear mechanism 11 which will be shortly described and as heretofore mentioned, one of the objects of the invention is to provide a gearing mechanism that will fit within the limit established by bracket or stirrup 10 and still be more powerful than the present mechanism now in use.

Figure 1:
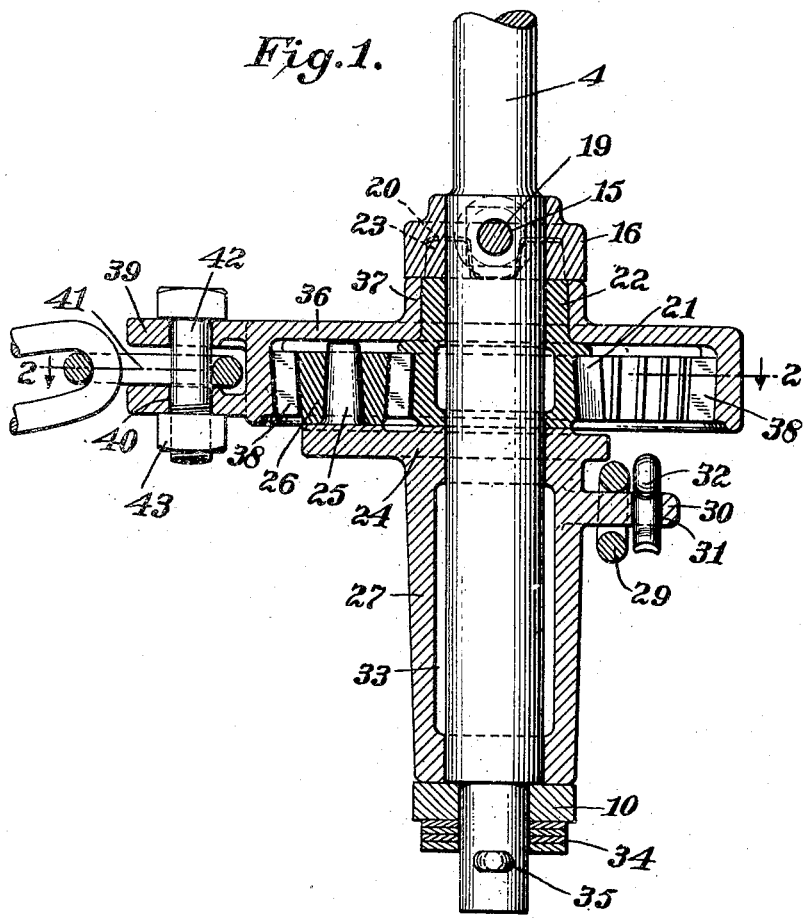
Fig. 1 is a vertical sectional view of the gear mechanism with the ends of the brake chain attached thereto.
Figure 2:
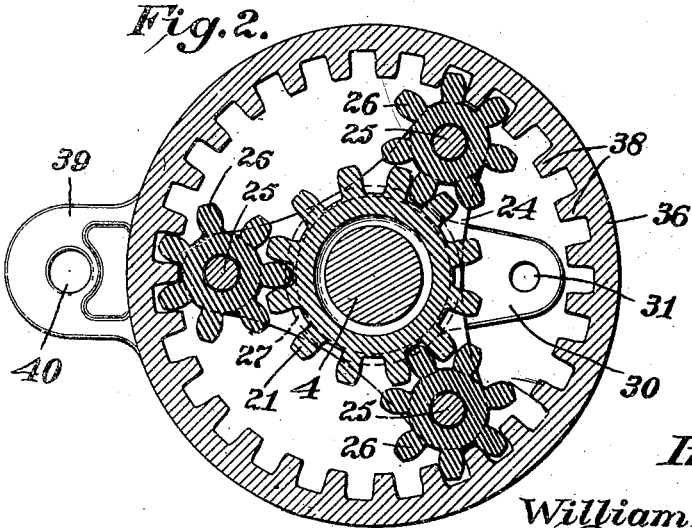
Fig. 2 is a sectional plan view on line 2—2 of Fig. 1.

Referring now more particularly to Figs. 1 and 2, there is shown the brake mast 4, which is provided with a hole 15, through which the usual ½ bolt 19 is placed. If this hole is not in a proper place in the brake mast to which the mechanism is to be applied, a new one will be drilled, so that this compact mechanism about to be explained, may be applied to the brake mast without further change.

There will be noticed that a cap 16 is placed about the brake mast 4, this cap being shown in detail in Figs. 7 and 8, there being a transversely located hole or passageway 18 for the reception of the bolt 19. The cap is also provided with the internal spaces 20 for the reception of the teeth on the upper surface of the hub of the sun gear, about to be explained. This cap then will be rigidly locked with relation to the brake mast 4 so that when the hand wheel 5 is operated this cap will, of course, revolve with the brake mast 4.

Referring now to Figs. 1, 2, 9 and 10, there is shown the sun gear 21 which is provided with the upwardly extending hub 22, while projecting upwardly from the hub are the teeth 23 which are designed to lock within the spaces 20 of the cap 16. It will, therefore, be seen that the sun gear is also locked with relation to the brake mast 4 and the cap 16. In the present instance I have shown four teeth 23 fitting within the four spaces of the cap and I have shown twelve teeth on the sun gear, but either the number of the upper teeth or the number of teeth on the sun gear may be changed if so desired.

Referring now to Figs. 1, 5 and 6, there is shown the spider 24 having the pintles or posts 25 at the ends of the arms of the spider on which are loosely mounted the idler gears 26, while formed integral with the spider and extending downwardly is the hub 27 which is in the form of a barrel or drum upon which the chain 29 may be wound. For a convenient fastening means, I provide the lug 30 with the opening 31 therethrough on the drum, so that one end of the chain 29 may be passed over this lug and a cotter pin 32 passed within the opening and spread to thus hold the end of the chain in position.

The drum 27 may have its internal diameter slightly enlarged as at 33 and the external diameter of the drum will be in certain relative proportion to the size of the different gears and pinions so that when the drum is revolved the desired amount of pressure will be applied to the brake beam.

In Fig. 1 I have shown a portion of the bracket 10 or stirrup which supports the drum, while the lower end of the brake mast and washers 34 are also shown together with a cotter pin 35 that passes through the lower end of the brake mast to lock the mast in the stirrup.

Referring now to Figs. 1 and 2, there is shown a housing 36 that is provided with the hollow hub 37, which in turn encircles the hub 22 of the sun gear 21, and on the internal vertical walls of this housing are the teeth 38 or, in other words, this housing is the ring gear for the planetary system and houses the sun gear and the planets that are loosely mounted on the pintles 25 of the spider 24.

Figure 4:
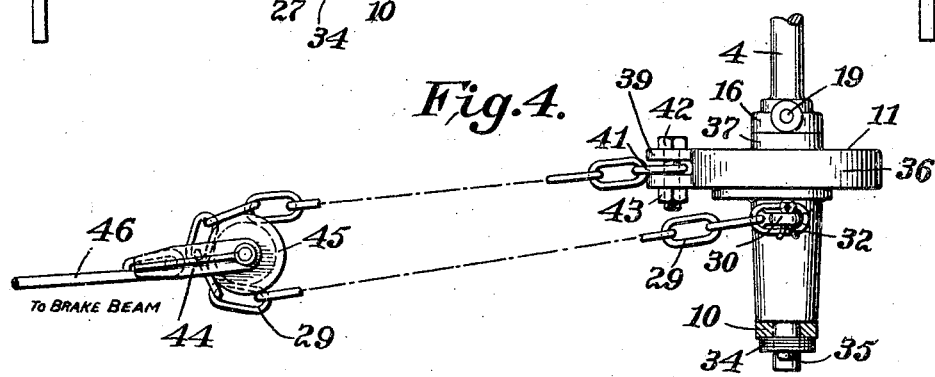
Fig. 4 is a side elevation of the gear mechanism and showing the manner of connecting the same to the brake cylinder lever.

Extending from the periphery of this housing 36 there is shown the lug 39 with the opening 40 to which is secured the other end 41 of the chain 29 as may be seen in Figs. 1 and 4, a bolt 42 being shown as passing through the lug 39 and locked by the nut 43.

Referring now for the moment to Figs. 4, 11 and 12, I have shown a yoke 44 on which is mounted the sheave 45, over which the aforementioned chain 29 passes, while secured to the opposite end of the yoke is fragmentarily shown a rod 46, which is connected at its opposite end to the brake cylinder lever (not shown) so that when the rod 46 is operated the brake shoes will be forced against the wheel in the usual manner.

The operation of the device will be easily understood and as in all planetary systems, if the spider with the idlers thereon, should be held against rotation, or in other words, the ring gear free; when the sun gear is revolved by a turning of the hand wheel and mast, it will cause the idlers to in turn force the ring gear in a direction opposite to the direction in which the sun gear is operated.

On the other hand, if the ring gear be held against rotation and the spider free to move when the sun gear is operated, the sun gear will force the spider to revolve in the same direction that the sun gear travels.

In the present instance we have the chain passing about the sheave and connected at one end to the ring gear or housing, while the other end is fastened to the drum which will be remembered is integral with the spider. Therefore, when the hand wheel 5 is operated and the chain 29 say is slack, an operation of the brake mast and the sun gear, will first cause the idlers to slightly revolve the ring gear until the tension is tight on the chain and ring gear, after which the holding of the ring gear will cause the sun gear to operate the spider in the reverse direction, which in turn is integral with the drum 27 and will, therefore, wind up the chain on the drum and pull the rod connected to the brake levers towards the brake mast which, of course, will apply the brake shoes to the wheel.

The pawl and ratchet, of course, will hold the brake mast in its tightened position and when the pawl is swung back the hand wheel may be revolved in the other direction to again loosen the brake.

In other words, inasmuch as the tension in the chain 29 will hold the ring gear against rotation, the idler gears or planets mounted on the spider will revolve within the ring gear and about the sun gear, and as the drum is an integral part of the spider, the drum will also revolve and thus wind up the chain to apply the brakes. The sun gear, of course, is locked in relation to the mast, but is free to revolve with respect to the drum.

In the present embodiment the braking power or pulling power as shown in Fig. 4 of the drawing is approximately six times the pulling power applied to the brake shaft. The ratio of the power between the brake shaft and the drum within the planetary gear mechanism is approximately 1 to 3, and when connected as shown, to the sheave, the ratio will be doubled making the same approximately 1 to 6.

This is more than called for by the car builders' standards, but there will be some loss due to friction as the gears will be castings and probably not machined.

It will be also understood that where the mechanism is to be applied to the lighter cars and a ratio of 1 to 3 is sufficient, the chain may be connected direct to the pull rod 46 allowing the arms 42 to be stopped in their rotation by the stirrup 10.

Furthermore, the ratio between the several gears and parts of the brake mechanism may be designed or made to suit the existing conditions.

From this it will be seen that I have provided a form of gearing that may be readily applied to the brake mast now in service, and that I have been able, with this form of mechanism, to house the parts in the stirrup that is now being used on the several forms of freight cars and at the same time have geared up the brake mast so that a greater amount of power may be applied with the same amount of effort than with the other forms of brakes now in use. It will also be seen that the appliance is relatively simple and that the only change needed to be made to install my device is to drill a new hole at the lower end of the brake mast, after which the planetary system may be quickly put in operation.

Having thus described my invention which I claim is new and desire to secure by Letters Patent is:—

1. In a geared hand brake for freight cars, a combination of brake mast and hand wheel secured thereto, a planetary gearing comprising the sun gear, ring gear and planet gears and a drum operably connected with said planet gears, the sun gear of the system being connected to the lower end of the brake mast, a tension means connected to the ring gear and the drum, a brake lever operated by the tension means to thereby operate brake shoes when the hand wheel is operated.

2. In a geared hand brake for freight cars, the combination of a brake mast and hand wheel, a planetary gearing, the sun gear of which is connected to the lower end of the brake mast, a spider having a drum formed integral therewith, and idler gears supported on the spider, a chain connected with the ring gear and also connected at its opposite end to the drum, said chain adapted to be connected to a brake lever, whereby an operation of the hand wheel in one direction will cause the sun gear to operate the drum to thereby apply the brakes.

3. In a hand geared brake for railway rolling stock, the combination of a hand wheel and brake mast, a pawl and ratchet connected with the mast, a planetary unit the sun gear of which is operably connected to the lower end of the mast, the spider having a drum extending beneath the same, a chain connected with the ring gear and also connected to the drum on the spider and adapted to be operably connected with the brakes, the chain holding the ring gear from operating when said sun gear is operated by said mast, to thereby cause the drum to revolve when said hand wheel is operated, to thereby apply the brakes.

4. In a geared hand brake for freight cars, the combination of a brake mast and hand wheel, a plentary gearing system comprising a sun gear, planets and ring gear, the sun gear of which is connected to the lower end of the brake mast, a winding drum loosely mounted on said mast, said winding drum journaled to the planets, a tension means connected to the ring gear and winding drum and a brake lever to operate brake shoes and the brake lever connected to said tension means whereby the brake lever is operated when the hand wheel is operated.

5. In a geared hand brake, the combination of a mast and wheel, a planetary gearing system having its sun gear secured to the lower end of the mast, a chain cooperating with two different rotatable parts of the planetary system, that is, the ring gear and planet gear and said chain adapted to be secured to the brakes, a rotation of the mast by said hand wheel while part of the system is held against rotation causing the other part to rotate to thereby wind up the chain and apply the brakes, and means for releasably holding the mast in a set position.

6. A planetary gearing system adapted to be connected to a brake mast, comprising a sun gear and means for locking same with relation to the mast, a spider having planet gears mounted thereon, a drum formed integral with the spider, a ring gear, and tension means connected between said ring gear and said drum.

7. A planetary gearing system adapted to be connected to a brake mast, said planetary system comprising a sun gear and means for locking same with relation to the mast, a spider having idler gears mounted thereon, a drum adapted to surround the lower end of the mast and formed integral with the spider, a ring gear and means connected with said ring gear and with said drum and adapted to be connected to the brakes whereby when the said sun gear is operated and said ring gear is held against rotation, the said spider will be operated to thereby rotate the drum and tighten the means adapted to be connected to the said brakes.

8. A planetary gearing system adapted to be secured to a brake mast, comprising a cap having an opening therein and having tooth sockets therein, a sun gear having a hub adapted to fit within the opening of the cap and provided with teeth on the upper surface of the hub, and said teeth adapted to be held in locked position within the tooth sockets of said cap, a spider having planet gears mounted thereon in mesh with said sun gear, a drum formed integral with the spider, a casing surrounding said sun gear and hub and said planets and provided with a ring gear meshing with said planets, and a chain, one end of said chain connected to said casing and the other end connected to said drum whereby when said brake mast is operated the casing may partially rotate and after which the said drum will tighten up said chain.

9. A planetary gearing system comprising a cap adapted to be secured about a brake mast, said cap provided with sockets, a sun gear having a hub with teeth thereon adapted to be locked with relation to said cap, a spider provided with planets thereon and a ring gear in the form of a casing enclosing said planets thereon and meshed therewith, a drum secured to said spider and adapted to encircle the brake mast, means formed on the periphery of the casing adapted to receive one end of a chain, means formed on the drum adapted for receiving the other end of the chain, said chain adapted to hold the ring gear against rotation.

10. A geared hand brake for freight cars comprising a brake mast and hand wheel, a planetary system having a sun gear operably connected with the lower end of the brake mast, a stirrup for supporting said brake mast and planetary system, a drum in said system, a chain connected with the drum and with the ring gear of the planetary system and said chain adapted to be connected to the brakes, and the chain holding the ring gear against operation to thereby cause the drum to revolve to operate said chain and brake.

11. A geared hand brake for freight cars comprising a brake mast and a planetary system, said system comprising in part a spider drum, planets, sun gear and ring gear, means for bolting the sun gear to the brake mast, a chain adapted to be connected to the ring gear, to the brakes and to the drum whereby a holding of the ring gear will cause the drum to revolve when the said sun gear is rotated by a manual rotation of the brake mast to thereby wind the chain about the drum and thereby apply the brakes.

12. In combination, a brake stirrup, a brake mast, a planetary gear system comprising a spider, planets, sun gear, ring gear and winding drum, said winding drum surrounding said mast and resting on said brake stirrup and trunnioned to said planets and means connecting said mast with the sun gear of said planetary system, a chain connected to the ring gear and said chain adapted to operate brake shoes, the other end of said chain connected with the said drum, whereby a rotation of the shaft will cause a winding of said drum in the same direction as said mast.

In testimony whereof I affix my signature.

WILLIAM E. WINE.